United States Patent
Sundholm (10) Patent No.: US 9,187,266 B2
(45) Date of Patent: Nov. 17, 2015

(54) METHOD AND APPARATUS IN A PNEUMATIC MATERIAL CONVEYING SYSTEM

(75) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 176 days.

(21) Appl. No.: 13/878,270

(22) PCT Filed: Sep. 30, 2011

(86) PCT No.: PCT/FI2011/050845
§ 371 (c)(1),
(2), (4) Date: Apr. 8, 2013

(87) PCT Pub. No.: WO2012/059625
PCT Pub. Date: May 10, 2012

(65) Prior Publication Data
US 2013/0209182 A1    Aug. 15, 2013

(30) Foreign Application Priority Data

Nov. 1, 2010   (FI) .................................... 20106143

(51) Int. Cl.
*B65G 53/00* (2006.01)
*B65G 53/24* (2006.01)
(Continued)

(52) U.S. Cl.
CPC ............... *B65G 53/24* (2013.01); *B65G 53/26* (2013.01); *E04F 17/10* (2013.01); *F24F 7/06* (2013.01); *F24F 13/26* (2013.01)

(58) Field of Classification Search
USPC .................................. 406/92, 153, 154, 197
See application file for complete search history.

(56) References Cited

U.S. PATENT DOCUMENTS 3,853,355 A * 12/1974 Buisson ......................... 406/19
4,076,321 A    2/1978 Haight et al.
(Continued)

FOREIGN PATENT DOCUMENTS

CN    1847110 A    10/2006
GB    592818         9/1947
(Continued)

OTHER PUBLICATIONS

English translation of the Decision on Grant received on Jul. 1, 2015 in corresponding Russian Patent Appliation No. 2013125447 (6 pages).

(Continued)

*Primary Examiner* — Joseph Dillon, Jr.
(74) *Attorney, Agent, or Firm* — Birch, Stewart, Kolasch & Birch, LLP (57) ABSTRACT

Method for handling outlet air in a pneumatic waste-conveying system, in which the outlet air is at least partly the conveying air to be used in waste conveying. The outlet air is blown from the outward blowing pipe (1) into a chamber (24) comprising at least one output aperture (22) and one second aperture (16, 17), in which second aperture a suction effect is achieved with the blowing of the outlet air such that additional air is brought into the body of outlet air in the chamber via the at least one second aperture (16, 17) as a consequence of the suction effect achieved with the outlet air, and that the outlet air and the additional air mix with each other at least partly in the chamber (24) before the output aperture (22) from which the mixture of outlet air and additional air is conducted away. The invention also relates to an apparatus.

12 Claims, 5 Drawing Sheets

(51) Int. Cl.
*B65G 53/26* (2006.01)
*E04F 17/10* (2006.01)
*F24F 7/06* (2006.01)
*F24F 13/26* (2006.01)

(56) References Cited

U.S. PATENT DOCUMENTS

| | | | | |
|---|---|---|---|---|
| 4,340,347 | A | * | 7/1982 | Robertson ................ 425/217 |
| 5,813,061 | A | * | 9/1998 | Tornqist ........................ 4/431 |
| 2005/0074303 | A1 | * | 4/2005 | Morohashi et al. ......... 406/194 |
| 2007/0048097 | A1 | * | 3/2007 | Heckendorn et al. ....... 406/108 |
| 2007/0183855 | A1 | * | 8/2007 | Sundholm ................... 406/141 |
| 2010/0278596 | A1 | * | 11/2010 | Sundholm ..................... 406/93 |
| 2010/0296880 | A1 | * | 11/2010 | Sundholm ..................... 406/48 |
| 2010/0303556 | A1 | * | 12/2010 | Sundholm ..................... 406/12 |
| 2010/0303557 | A1 | * | 12/2010 | Sundholm ..................... 406/47 |
| 2010/0310326 | A1 | * | 12/2010 | Sundholm ..................... 406/85 |
| 2010/0310327 | A1 | * | 12/2010 | Sundholm ................... 406/106 |
| 2011/0002748 | A1 | * | 1/2011 | Sundholm ..................... 406/46 |
| 2011/0132814 | A1 | * | 6/2011 | Miller ........................ 209/139.1 |
| 2011/0266802 | A1 | * | 11/2011 | Rehman Alvi ................. 290/52 |
| 2012/0155975 | A1 | * | 6/2012 | Sundholm ..................... 406/84 |
| 2012/0181233 | A1 | * | 7/2012 | Artoni et al. ................ 210/739 |
| 2013/0000532 | A1 | * | 1/2013 | Rabiner ....................... 110/346 |
| 2014/0263045 | A1 | * | 9/2014 | Mazumdar et al. ......... 210/612 |
| 2014/0328633 | A1 | * | 11/2014 | Nierescher et al. ........... 406/19 |
| 2015/0050091 | A1 | * | 2/2015 | Sundholm ..................... 406/46 |
| 2015/0117955 | A1 | * | 4/2015 | Houston ..................... 405/129.9 |

FOREIGN PATENT DOCUMENTS

| | | |
|---|---|---|
| JP | 49-77373 A | 7/1974 |
| JP | 51-105170 A | 9/1976 |
| JP | 59-153929 U | 10/1984 |
| JP | 09-001118 A | 1/1997 |
| JP | 2009-292612 A | 12/2009 |
| KR | 10-20100036673 A | 4/2010 |
| SE | 395 665 B | 8/1977 |
| SU | 840604 A | 6/1981 |
| WO | WO 2005/085104 A1 | 9/2005 |
| WO | WO 2005/085105 A1 | 9/2005 |
| WO | WO 2007/065966 A1 | 6/2007 |
| WO | WO 2009/057923 A1 | 5/2009 |
| WO | WO 2009/080880 A1 | 7/2009 |
| WO | WO 2009/080881 A1 | 7/2009 |
| WO | WO 2009/080882 A1 | 7/2009 |
| WO | WO 2009/080883 A1 | 7/2009 |
| WO | WO 2009/080884 A1 | 7/2009 |
| WO | WO 2009/080885 A1 | 7/2009 |
| WO | WO 2009/080886 A1 | 7/2009 |
| WO | WO 2009/080887 A1 | 7/2009 |
| WO | WO 2009/080888 A1 | 7/2009 |

OTHER PUBLICATIONS

Office Action issued in corresponding Japanese Patent Application No. 2013-537173 received Jul. 28, 2015 in English (4 pages).

* cited by examiner

METHOD AND APPARATUS IN A PNEUMATIC MATERIAL CONVEYING SYSTEM

BACKGROUND OF THE INVENTION

The object of an embodiment of the invention is a method and an apparatus for handling outlet air in a pneumatic waste-convenying system wherein the outlet air is at least partly the conveying air to be used in waste conveying.

The invention relates generally to pneumatic material conveying systems, such as to partial-vacuum conveying systems, more particularly to the collection and conveying of wastes, such as to the conveying of household wastes. Such systems are presented in publications WO 2009/080880, WO 2009/080881, WO 2009/080882, WO 2009/080883, WO 2009/080884, WO 2009/080885, WO 2009/080886, WO 2009/080887 and WO 2009/080888, among others.

Systems wherein wastes are conveyed in piping by means of suction and/or by means of a pressure difference are known in the art. In these, wastes are conveyed long distances in conveying piping. The apparatuses are used for, among other things, the conveying of wastes in different institutions. It is typical to these systems that a partial-vacuum apparatus is used to achieve a pressure difference, in which apparatus a partial vacuum is achieved in the conveying pipe with partial-vacuum generators, such as with vacuum pumps or with an ejector apparatus. A conveying pipe typically comprises at least one valve means, by opening and closing which the replacement air coming into the conveying pipe is adjusted. In partial-vacuum conveying systems there are typically noise problems, as well as dust problems and fine particle problems, in the outlet pipe. Especially in waste-conveying systems odor nuisances, which are perceived as unpleasant, often occur in the outlet air. Efforts have been made to reduce odor nuisances by using a liquid-air-ejector as a partial-vacuum generator, the liquid, more particularly liquid mist, functioning as the operating medium of which ejector enhances the suction and binds odors and particles. Some such as these are presented in publications WO 2005/085104, WO 2005/085105 and WO2007/065966, among others. In addition, known in the art are solutions in which a liquid that reduces odor nuisances is brought into the ejector pump. These have functioned fairly well, but they require a certain type of partial-vacuum generator, which is not necessarily suited to all waste-transporting systems.

The aim of the present invention is to achieve a new type of solution in connection with an outward blowing pipe of a waste system, by means of which solution the drawbacks of prior art solutions are avoided. Yet another aim of the invention is to achieve a solution by means of which the odor nuisances of the outlet air of the system as well as possible noise problems in connection with the outward blowing pipe can be decreased.

BRIEF DESCRIPTION OF THE INVENTION

The invention is based on a concept in which additional air, which dilutes the originators of odor in the air volume, is brought into connection with the outlet air.

The method according to the invention is mainly characterized in that the outlet air is blown from the outward blowing pipe into a chamber comprising at least one output aperture and one second aperture, in which second aperture a suction effect is achieved with the blowing of the outlet air such that additional air is brought into the body of outlet air in the chamber via the at least one second aperture as a consequence of the suction effect achieved with the outlet air, and in that the outlet air and the additional air mix with each other at least partly in the chamber before the output aperture from which the mixture of outlet air and additional air is conducted away.

The apparatus according to the invention is mainly characterized in that the outward blowing end of the outward blowing pipe is fitted into a chamber comprising at least one output aperture and one second aperture, in which at least one second aperture a suction effect is achieved with the blowing of the outlet air such that additional air is brought into the body of outlet air in the chamber via the at least one second aperture as a consequence of the suction effect achieved with the outlet air, and in that the outlet air and the additional air are fitted to mix with each other at least partly in the chamber before the output aperture from which the mixture of outlet air and additional air is conducted away.

The solution according to the invention has a number of important advantages. With the solution according to the invention, it is possible to essentially reduce the odor nuisances of the outlet air by adding air to the body of outlet air. By forming a chamber from an outer pipe arranged at least around the outward blowing end of the outward blowing pipe, a flexible solution for an apparatus, which is also very suited for manufacturing, is achieved. By shaping the shape of the outer pipe and/or the outward blowing end of the outward blowing pipe, the mixing effect and/or the suction effect of the additional air of the apparatus can be influenced. The apparatus can also be used for removing odors from a waste station or waste room. By directing or diffusing the air flow in the proximity of the output aperture, the perceived odor nuisance can be further reduced. With the solution according to the invention, the noise problem of prior art can also be essentially reduced. By arranging an ejector device in connection with the pipe for outlet air, the operating medium of which ejector device is the blowing air, extremely effective importing of additional air into the body of outlet air is achieved. By arranging a number of outward blowing pipes adjacently into a group, flow speeds can be boosted as a result of the combined effect of their blowings and a more effective suction effect on the additional air can be achieved. This further enhances the mixing of additional air into the blowing air. The mixing of additional air can be arranged according to one embodiment of the invention in a number of phases.

BRIEF DESCRIPTION OF THE FIGURES

In the following, the invention will be described in more detail by the aid of an example of its embodiment with reference to the attached drawings, wherein.

DETAILED DESCRIPTION OF THE INVENTION

Figure 1:
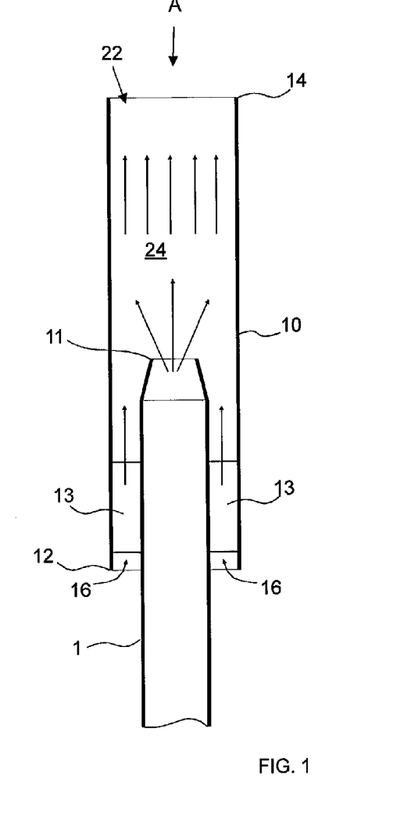
FIG. 1 presents a simplified cross-section of one device according to an embodiment of the invention.
Figure 2:
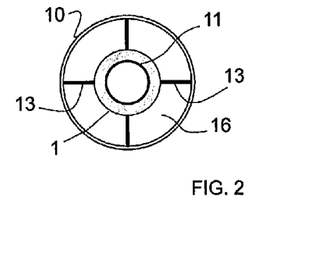
FIG. 2 presents the device of FIG. 1, as viewed from the direction A.

FIG. 1 presents a simplified view of one solution of an embodiment of the invention.

The outward blowing pipe 1 of the pneumatic pipe transport system for wastes is only partially presented in the figure. A second pipe part, i.e. an outer pipe 10, is arranged around the outward blowing pipe 1. The outer pipe 10 in FIG. 1 is a straight pipe part, the first end 12 (the bottom end in the figure) of which extends from the outward blowing end 11 of the outward blowing pipe 1 to some extent towards the input direction of the outlet pipe, i.e. in the opposite direction with respect to the input direction of the gases of the outlet pipe. The second end 14, i.e. the top end in FIG. 1, of the outer pipe extends a distance from the outward blowing end 11 of the outward blowing pipe 1 in the main blowing direction (upwards in FIG. 1) of the gases of the outward blowing pipe. Tie parts 13 are arranged between the outward blowing pipe and the outer pipe. In the embodiment of FIG. 1, the outer pipe 10 is essentially co-axial with the outward blowing pipe 1. A ring-shaped space, which is bounded by the outer pipe and the outward blowing pipe, and also the tie parts 13 remain between the outward blowing pipes 1 and the outer pipe 10. There is an aperture 16 between the bottom part 12 of the outer pipe and the outward blowing pipe 1. When outlet air is blown from the outward blowing aperture of the outward blowing pipe 1 into the chamber 24, suction is achieved between the outer pipe 10 and the outward blowing pipe 1, which suction pulls additional air from the aperture 16 between the bottom part 12 of the outer pipe and the outward blowing pipe 1. The additional air mixes in the chamber 24 into the outlet air coming from the outward blowing aperture of the outward blowing pipe 1 before the top end 14 of the outer pipe, in which case the air to be blown out from the output aperture 22 of the outer pipe contains, with respect to the air volume, fewer components causing an odor than just the air that is to be blown out from the outward blowing pipe. This reduces the perceived odor nuisance of the outlet air. The ejector effect, i.e. the suction effect, of the device according to the invention can be improved by shaping the end 11 of the outward blowing pipe, as has been done in the figures, by choking it e.g. by forming the end of the outward blowing pipe into a convergent part of a truncated cone, in which the cone becomes smaller towards the outward blowing end.

Figure 3:
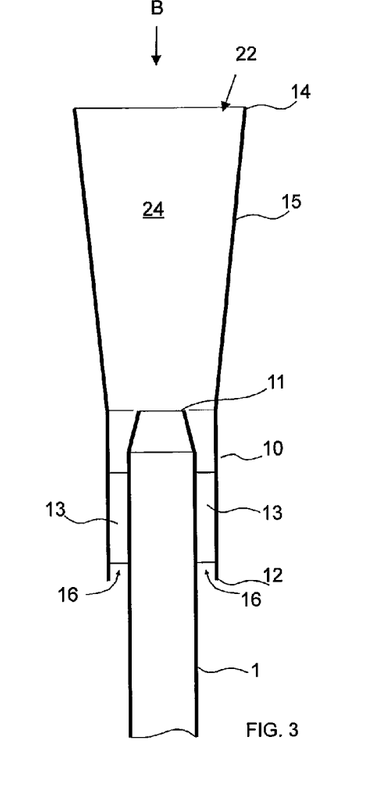
FIG. 3 presents a simplified cross-section of one device according to an embodiment of the invention.
Figure 4:
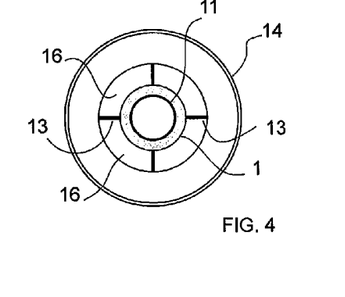
FIG. 4 presents the device of FIG. 2, as viewed from the direction B.

FIGS. 3 and 4 present a second embodiment, in which the outer pipe 10 expands, starting from the level of the outward blowing end of the outward blowing pipe towards the second end 14 of the outer pipe, in the manner of a truncated cone. The expanding section 15 of the outer pipe 10 has been formed such that the additional air coming from the aperture 16 into the body of outlet air mixes in the chamber 24 as well as possible into the body of outlet air before the second end 14 of the outer pipe and the output aperture 22.

Figures 5, 6, 7, 8:
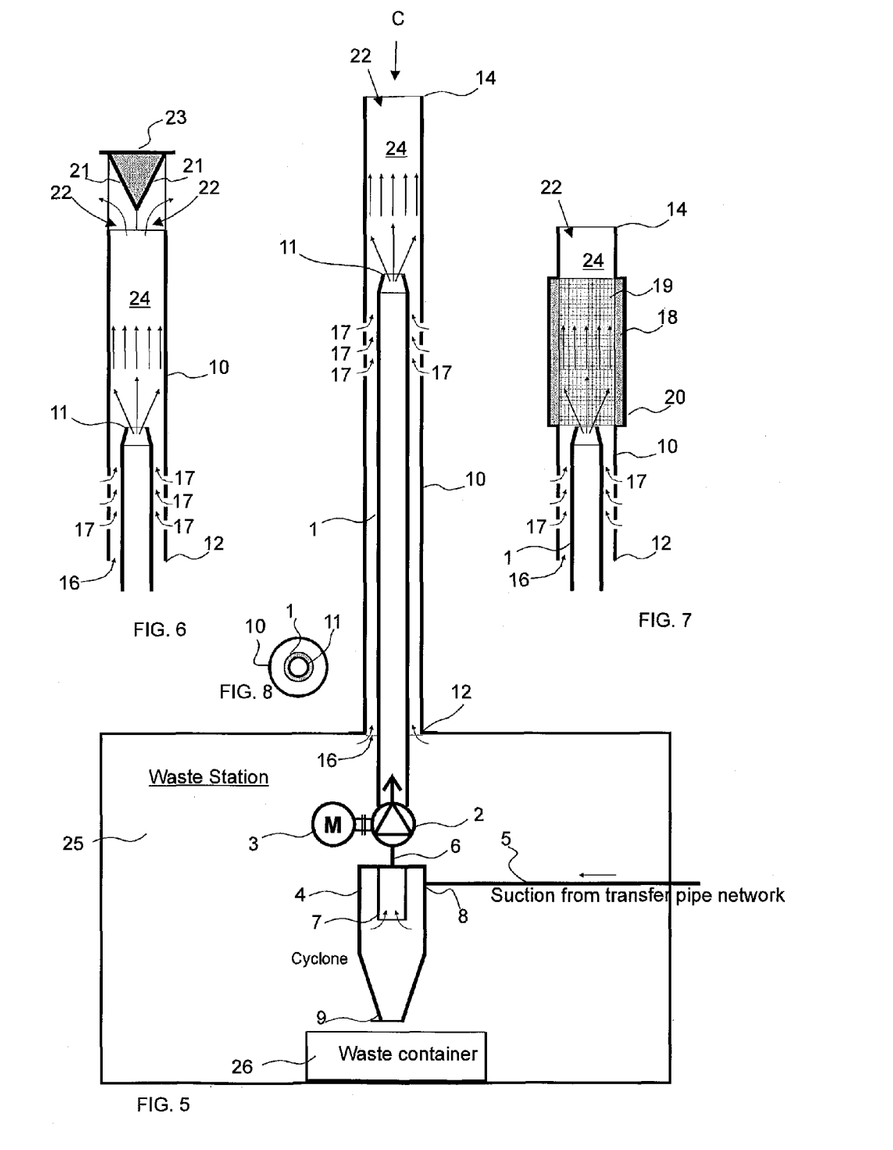
FIG. 5 presents a simplified and partly diagrammatic view of one device according to an embodiment of the invention, in connection with a waste station.
FIG. 6 presents a simplified cross-section of one device of an embodiment of the invention.
FIG. 7 presents a simplified cross-section of yet another device of an embodiment of the invention.
FIG. 8 presents the device of FIG. 5, as viewed from the direction C.

FIGS. 5 and 8 present an embodiment according to the invention wherein the outer pipe 10 extends for a considerable part of the whole length of the outward blowing pipe 1. The bottom end 12 of the outer pipes 10 has been arranged into the structures of a waste station 25 or waste room, in which case the aperture 16 between the outer pipe 10 and the outward blowing pipe 1 opens into the inner space of the waste station 25 or waste room. In this case the suction achieved with the outlet air of the outward blowing pipe 1 in the duct space between the outer pipe 10 and the outward blowing pipe 1, and from the aperture 16, causes conducting of the air of the inner space of the waste station 25 in the space between the outer pipe and the outward blowing pipe towards the top end 14 of the outer pipe. At least one aperture 17, a number of apertures 17 in the embodiment of the figure, has additionally been formed in the outer pipe 10, from which additional air can be conducted into the inner space of the outer pipe and onwards into the chamber 24. The simplified apparatus of FIG. 5 functions as follows: a partial-vacuum generator 2, which is driven with a drive device 3, is connected with a pipeline 6 from the suction side of the partial-vacuum generator to a separating means 4, which can be e.g. a cyclone separator. The transfer piping 5 of a pneumatic waste-transporting system is connected to the separating means 4, e.g. to the top part 8 of the separating means, in which case the waste material to be transferred separates from the conveying air in the separating means 4. The heavier particles and waste travel in the separating means, e.g. by means of centrifugal force and/or gravitational force, into the bottom part 9 of said separating means, from where they are emptied from time to time, e.g. into a waste container 26 below the separating means. The conveying air separated from the wastes, for its part, is conducted from the separating means 4, from its top part 7, to the blowing side of the partial-vacuum generator 2 and onwards into the outward blowing pipe 1. The suction achieved with the outlet air of the outward blowing pipe 1 between the outer pipe 10 and the outward blowing pipe 1, and from the aperture 16, causes conducting of the air of the inner space of the waste station in the space between the outer pipe 10 and the outward blowing pipe 1 towards the top end 14 of the outer pipe. In this way the ventilation or air venting of the waste station or waste room is achieved. In addition, from the at least one aperture 17 formed in the outer pipe 10 additional air is conducted from the effect of suction into the body of outlet air and of air conducted from the waste station, in which case the particles causing an odor nuisance decrease in relation to the total volume of air and the perceived odor nuisance of the air to be conducted out via the output aperture of the outer pipe decreases.

According to FIG. 6, with the placement or shaping of the output aperture 22 of the outer pipe 10, the outlet air can be guided in the outward blowing direction. The outlet air can be conducted/guided from the chamber 24 from the top end 14 of the outer pipe 10 out of the output aperture 22 in different directions. In this case the perceived odor nuisance can be further reduced when the air volume of the outlet air disperses more widely in different directions. In addition, the air to be blown out mixes into the surrounding air better when it is diffused effectively in the proximity of the output aperture. In FIG. 6 a guide/diffuser 23 of the air flow has been arranged in the top end of the outer pipe, wherein a guide surface 21 has been arranged in the top end of the outer pipe, which guide surface deflects/diffuses the outlet air from the output aperture 22 of the outer pipe 10 in different directions, such as deflects/diffuses the outlet air at least partly in transverse directions, e.g. in radial directions.

The embodiment of FIG. 7 comprises an embodiment of a solution according to the invention wherein a sound diffuser 20 has been arranged in connection with the outer pipe. The sound diffuser has been arranged in the outer pipe, in which case an extension has been formed in the outer pipe, onto the interior wall of which a suitable material layer 18 of sound-diffusing material, such as sound-diffusing material wool, such as mineral wool, has been arranged. A net 19, such as a metal net, has been arranged in the inside wall of the chamber 24 of the outer pipe after the sound-diffusing material layer 18.

Figure 9:
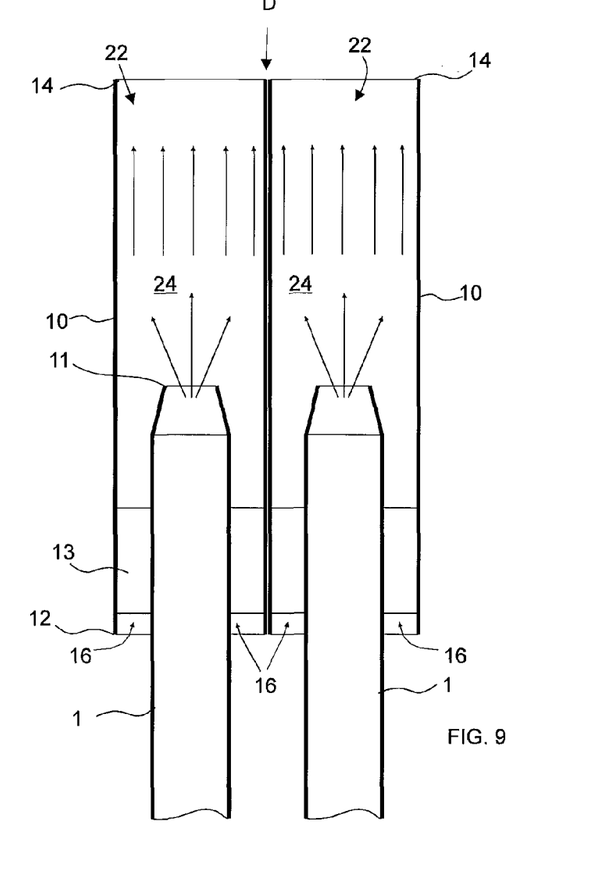
FIG. 9 presents a simplified cross-section of one device according to an embodiment of the invention, sectioned along the line IX-IX of FIG. 10.
Figure 10:
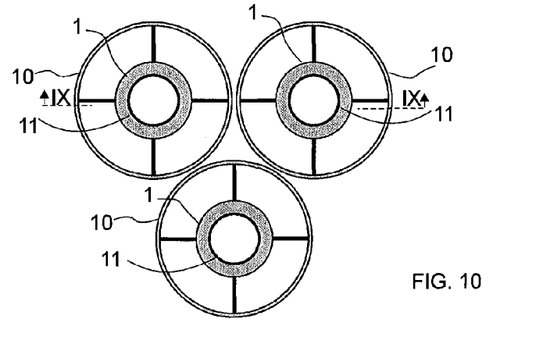
FIG. 10 presents the device of FIG. 9, as viewed from the direction D.

FIGS. 9 and 10 present an embodiment of the invention in which a number of outward blowing pipes 1, which comprise an outer pipe 10, have been arranged adjacently into a group. When outlet air is blown from the outward blowing aperture of outward blowing pipes 1 arranged adjacently into each chamber 24, suction is produced between the outer pipe 10 and the outward blowing pipe 1, which suction pulls additional air from the aperture 16 between the bottom part 12 of the outer pipe and the outward blowing pipe 1. The additional air mixes in the chamber 24 into the outlet air coming from the outward blowing aperture of the outward blowing pipe 1 before the top end of the outer pipe, in which case the air to be blown out from the output aperture 22 of the outer pipe contains, with respect to the air volume, fewer components causing an odor than just the air that is to be blown out from the outward blowing pipe. This reduces the perceived odor nuisance of the outlet air. Outward blowing pipes disposed adjacently strengthen the suction effect and thus enhance the mixing.

Figure 11:
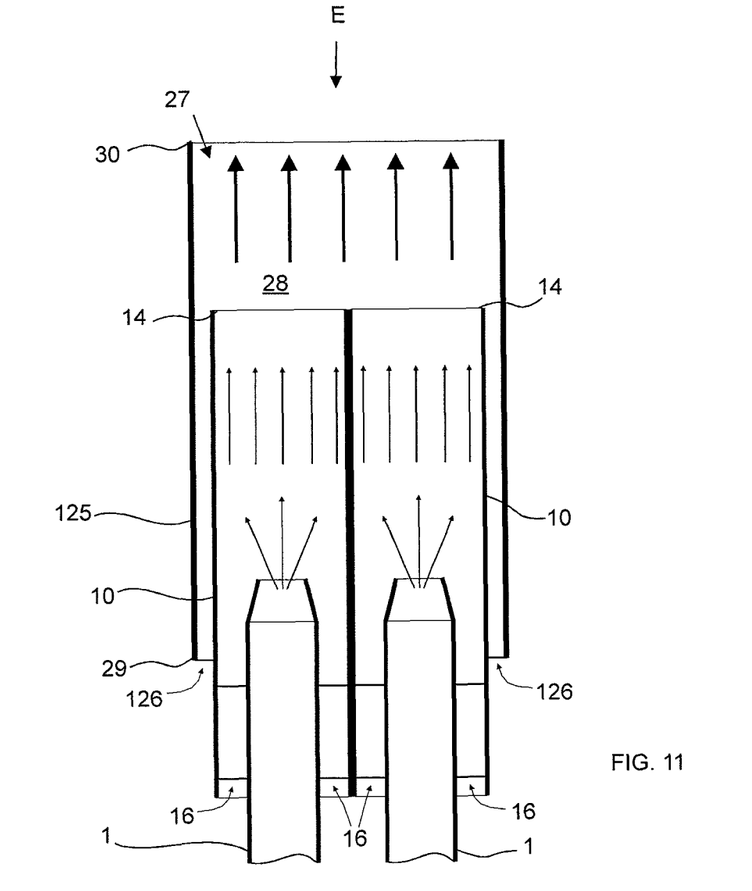
FIG. 11 presents yet another simplified cross-section of one device according to an embodiment of the invention, sectioned along the line XI-XI of FIG. 12.
Figure 12:
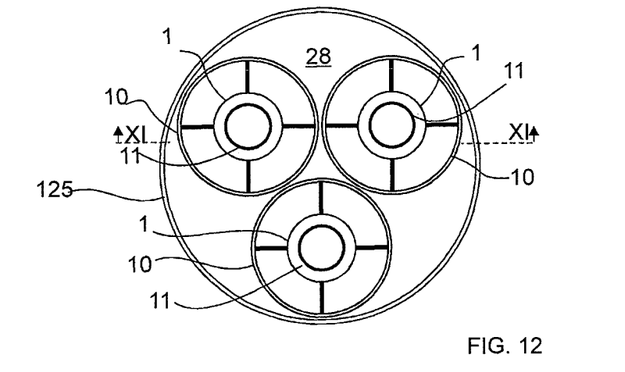
FIG. 12 presents the device of FIG. 11, as viewed from the direction E.

FIGS. 11 and 12 present an embodiment of the invention in which a number of outward blowing pipes 1, around each of which an outer pipe 10 has been arranged, have been arranged into a group. An outer pipe 125 of the group is arranged in connection with the group of outward blowing pipes.

The outer pipe 125 of the group of outward blowing pipes in FIGS. 11 and 12 is a straight pipe part, the first end 29, the bottom end in the figure, of which extends from the outward blowing end of the outer pipe 10 of an outward blowing pipe 1 to some extent towards the input direction of the outlet pipe, i.e. in the opposite direction with respect to the input direction of the gases. The second end 30, i.e. the top end in FIG. 11, of the outer pipe 125 the group extends a distance from the outward blowing end of the outer pipe 10 of an outward blowing pipe in the main blowing direction (upwards in FIG. 11) of the gases of the outward blowing pipe. A space remains between the outer pipe 125 of a group and the outer pipes 10 of an outward blowing pipe 1, which is bounded by the inner surface of the outer pipe 125 of a group and the outer surfaces of the outer pipes 10 of the outward blowing pipes. There is an aperture 126 between the bottom part 29 of the outer pipe 125 of a group and the outer pipes 10 of an outward blowing pipe 1. When outlet air is blown from the outward blowing aperture of an outward blowing pipe 1 into the chamber 24 of an outer pipe 10, suction is produced between the outer pipe 10 and the outward blowing pipe 1, which suction pulls additional air from the aperture 16 between the bottom part of the outer pipe and the outward blowing pipe 1. Correspondingly when outlet air is blown from the top end of an outer pipe into the chamber 28 of an outer pipe of a group, suction is produced between the outer pipe of the group and the outer pipes of the outward blowing pipes, which suction pulls additional air from the aperture 126 between the bottom part 29 of the outer pipe 125 of the group and/or the outer pipes 10 of the outward blowing pipes. The additional air mixes in the chamber 28 into the outlet air coming from the outward blowing aperture of the outward blowing pipe 1 and the outer pipe before the top end 30 of the outer pipe 125 of the group, in which case the air to be blown out from the output aperture 27 of the outer pipe 125 of the group contains, with respect to the air volume, fewer components causing an odor than just the air that is to be blown out from the outward blowing pipe. This reduces the perceived odor nuisance of the outlet air. In the solution according to FIGS. 11 and 12, the additional air can thus be mixed into the outlet air in two phases: in the first phase from the apertures between the outward blowing pipe 1 and its outer pipe 10 in the chamber 24, and in the second phase into the additional air to be conducted from the aperture 126 between the outer pipe 10 and the outer pipe of the groups in the chamber 28.

Figure 13:
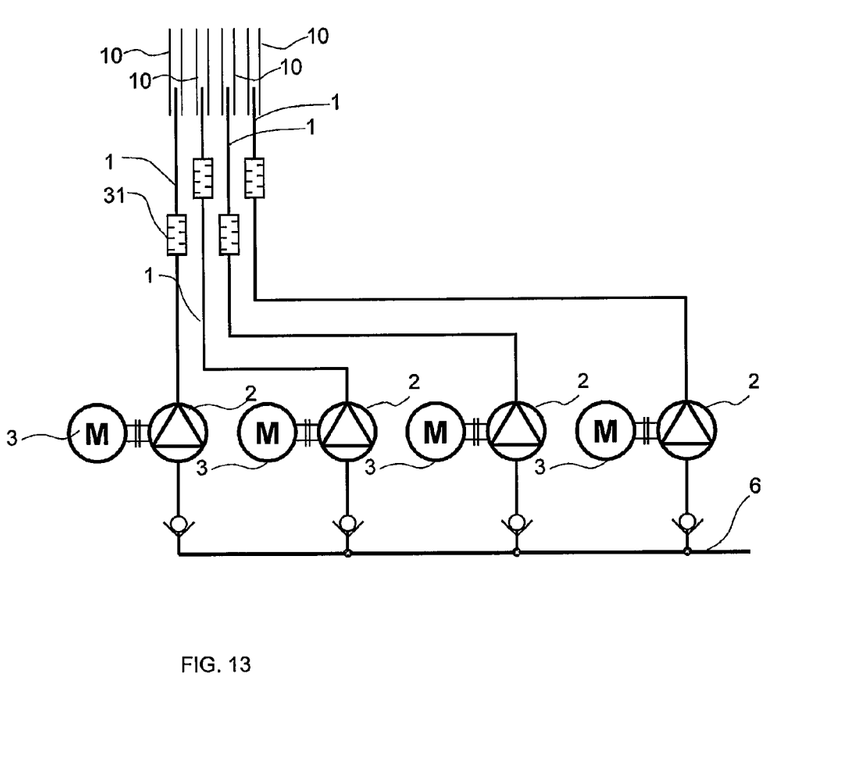
FIG. 13 presents as a diagram one solution of an embodiment of the invention.

FIG. 13 further presents as a diagram an arrangement comprising a number of partial-vacuum generators 2, which are used as drive devices 3. The partial-vacuum generators 2 can be connected in parallel from their suction sides to the pipeline 6, which leads to a separating device (not shown) and onwards into transfer piping (not shown). The blowing side of each partial-vacuum generator, or the blowing side of the groups formed by a number of partial-vacuum generators, is led as its own pipeline into the outward blowing pipe 1 and onwards into the outer pipe 10. Each pipeline 1 is provided in the figure with a sound diffuser 31.

The invention thus relates to a method for handling outlet air in a pneumatic waste-conveying system, in which the outlet air is at least partly the conveying air to be used in waste conveying. The outlet air is blown from the outward blowing pipe 1 into a chamber 24 comprising at least one output aperture 22 and one second aperture 16, 17, in which second aperture a suction effect is achieved with the blowing of the outlet air such that additional air is brought into the body of outlet air in the chamber via the at least one second aperture 16, 17 as a consequence of the suction effect achieved with the outlet air, and that the outlet air and the additional air mix with each other at least partly in the chamber 24 before the output aperture 22 from which the mixture of outlet air and additional air is conducted away.

According to one preferred embodiment the chamber 24 is formed from an outer pipe 10 arranged around at least the outward blowing end 11 of the outward blowing pipe 1.

According to one preferred embodiment at least one second aperture 16 has been formed between the bottom part 12 of the outer pipe 10 and the outward blowing pipe 1.

According to one preferred embodiment at least one second aperture 17 has been arranged through the wall of the outer pipe 10 into a space in which the suction effect achieved with the outlet air of the outward blowing pipe is fitted to act.

According to one preferred embodiment in the method at least one second aperture 17 has been arranged in the wall of the outer pipe 10 in an area which extends from the point of the outward blowing end 11 of the outward blowing pipe 1 in the opposite direction with respect to the outward blowing direction.

According to one preferred embodiment the bottom part 12 of the outer pipe 10 extends to the top part of the waste station 25 or waste room, or to the proximity of said top part, such that there is a medium connection from the space of the waste station or waste room to the space between the outer pipe 10 and the outward blowing pipe 1 such that with the outward blowing suction is achieved in the space of the waste station or waste room via the aperture 16 of the bottom part of the outer pipe.

According to one preferred embodiment in the method the noise produced in the blowing of the outlet air is damped with a sound diffuser 20.

According to one preferred embodiment in the method the air to be removed is directed or diffused in the proximity of the output aperture 22 with a guide surface 21.

According to one preferred embodiment in the method the chamber 24 expands towards the output aperture 22.

According to one preferred embodiment in the method the outward blowing pipes 1 are arranged into a group formed by a number of outward blowing pipes 1.

According to one preferred embodiment in the method the outward blowing pipes 1 are fitted to be adjacent such that their blowings strengthen each other and the suction effect achieved by the blowings on the additional air.

According to one preferred embodiment in the method the outward blowing air of a group formed by a number of outward blowing pipes 1 is blown into a second chamber 28, which is formed at least partly around a group formed by outward blowing pipes, in which second chamber additional air is brought into the body of outlet air as a consequence of the suction effect achieved by the outlet air via at least one suction aperture 126, and that the outlet air and the additional air mix with each other at least partly in the second chamber 28 before the output aperture 27 from which the mixture of outlet air and additional air is conducted away.

The invention also relates to an apparatus for handling outlet air in a pneumatic waste-conveying system, in which the outlet air is at least partly the conveying air to be used in waste conveying, which apparatus comprises an outward blowing pipe 1 and also devices for conducting the outlet air into the outward blowing pipe. The outward blowing end 11 of the outward blowing pipe 1 has been fitted into a chamber 24 comprising at least one output aperture 22 and one second aperture 16, 17, in which at least one second aperture 16, 17 a suction effect is achieved with the blowing of the outlet air such that additional air is brought into the body of outlet air in the chamber via the at least one second aperture 16, 17 as a consequence of the suction effect achieved with the outlet air, and that the outlet air and the additional air are fitted to mix with each other at least partly in the chamber 24 before the output aperture 22 from which the mixture of outlet air and additional air is conducted away.

According to one preferred embodiment the chamber 24 has been formed from an outer pipe 10 arranged around at least the outward blowing end 11 of the outward blowing pipe 1.

According to one preferred embodiment at least one second aperture 16 has been formed between the bottom part 12 of the outer pipe 10 and the outward blowing pipe 1.

According to one preferred embodiment at least one second aperture 17 has been arranged through the wall of the outer pipe 10 into a space in which the suction effect achieved with the outlet air of the outward blowing pipe is fitted to act.

According to one preferred embodiment at least one second aperture 17 has been arranged in the wall of the outer pipe 10 in an area which extends from the point of the outward blowing end 11 of the outward blowing pipe 1 in the opposite direction with respect to the outward blowing direction.

According to one preferred embodiment the bottom part 12 of the outer pipe 10 extends to the top part of the waste station 25 or waste room, or to the proximity of said top part, such that there is a medium connection from the space of the waste station or waste room to the space between the outer pipe 10 and the outward blowing pipe 1 such that with the outward blowing suction is achieved in the space of the waste station or waste room via the aperture 16 of the bottom part of the outer pipe.

According to one preferred embodiment the apparatus comprises means 18, 19, 20 for damping the noise produced by outward blowing.

According to one preferred embodiment the apparatus comprises a guide surface 21 for directing or for diffusing in the proximity of the output aperture 22 the air flow to be removed.

According to one preferred embodiment the chamber 24 expands towards the output aperture 22.

According to one preferred embodiment the outward blowing pipes 1 are arranged into a group formed by a number of outward blowing pipes 1.

According to one preferred embodiment the outward blowing pipes 1 are fitted to be adjacent such that their blowings strengthen each other and the suction effect achieved by the blowings.

According to one preferred embodiment the outward blowing end 11 of the outward blowing pipes 1, or the output aperture 22 of the outer pipes 10, of a group formed by a number of outward blowing pipes is fitted into a second chamber 28, comprising at least one output aperture 27 and one second aperture 126, in which second chamber 28 additional air is brought into the body of outlet air as a consequence of the suction effect achieved by the outlet air via at least one suction aperture 126, and that the outlet air and the additional air mix with each other at least partly in the second chamber 28 before the output aperture 27 from which the mixture of outlet air and additional air is conducted away.

According to one preferred embodiment the second chamber 28 has been formed from a group of outer pipes 125 arranged around at least the outward blowing end of an outward blowing pipe 1 or of an outer pipe 10.

It is obvious to the person skilled in the art that the invention is not limited to the embodiments presented above, but that it can be varied within the scope of the claims presented below. The characteristic features possibly presented in the description in conjunction with other characteristic features can, if necessary, also be used separately to each other.

The invention claimed is:

1. A method for handling outlet air in a pneumatic waste-conveying system, in which the outlet air is at least partly the conveying air used in waste conveying, comprising the following steps:
    blowing the outlet air by a partial vacuum generator of the waste conveying system to an outward blowing pipe (1) into a chamber (24) comprising at least one output aperture (22) and at least one second aperture (16, 17),
    achieving a suction effect in the at least one second aperture (16, 17) with the blowing of the outlet air wherein additional air is brought into the outlet air in the chamber (24) via the at least one second aperture (16, 17) as a consequence of the suction effect achieved with the outlet air,
    mixing the outlet air and the additional air with each other at least partly in the chamber (24), and
    discharging the mixture of outlet air and additional air from the output aperture (22).

2. The method according to claim 1, wherein the chamber (24) is formed from an outer pipe (10) arranged around at least the outward blowing end (11) of the outward blowing pipe (1).

3. The method according to claim 1, wherein at least one second aperture (16) is formed between the bottom part (12) of the outer pipe (10) and the outward blowing pipe (1).

4. The method according to claim 1, wherein at least one second aperture (17) is arranged through the wall of the outer pipe (10) into a space in which the suction effect achieved with the outlet air of the outward blowing pipe is fitted to act.

5. The method according to claim 1, wherein at least one second aperture (17) is arranged in the wall of the outer pipe (10) in an area which extends from the point of the outward blowing end (11) of the outward blowing pipe (1) in the opposite direction with respect to the outward blowing direction.

6. The method according to claim 1, wherein the bottom part (12) of the outer pipe (10) extends to the top part of the waste station (25) or waste room, or to the proximity of said top part, such that there is a medium connection from the space of the waste station or waste room to the space between the outer pipe (10) and the outward blowing pipe (1) such that with the outward blowing suction is achieved in the space of the waste station or waste room via the aperture (16) of the bottom part of the outer pipe.

7. The method according to claim 1, wherein the noise produced in the blowing of the outlet air is damped with a sound diffuser (20).

8. The method according to claim 1, wherein the air to be removed is directed or diffused in the proximity of the output aperture (22) with a guide surface (21).

9. The method according to claim 1, wherein the chamber (24) expands towards the output aperture (22).

10. The method according to claim 1, wherein outward blowing pipes (1) are arranged into a group formed by a number of outward blowing pipes (1).

11. The method according to claim 10, wherein the outward blowing pipes (1) are fitted to be adjacent such that their blowings strengthen each other and the suction effect achieved by the blowings on the additional air.

12. The method according to claim 10, wherein the outward blowing air of a group formed by a number of outward blowing pipes (1) is blown into a second chamber (28), which is formed at least partly around a group formed by outward blowing pipes, in which second chamber additional air is brought into the body of outlet air as a consequence of the suction effect achieved by the outlet air via at least one suction aperture (126), and in that the outlet air and the additional air mix with each other at least partly in the second chamber (28) before the output aperture (27) from which the mixture of outlet air and additional air is conducted away.

* * * * *